(12) United States Patent
Chuang et al.

(10) Patent No.: US 8,320,118 B2
(45) Date of Patent: Nov. 27, 2012

(54) MOUNTING APPARATUS FOR DISK DRIVE

(75) Inventors: Ken-Yao Chuang, Taipei Hsien (TW); Chia-Wen Tsai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 207 days.

(21) Appl. No.: 12/981,557

(22) Filed: Dec. 30, 2010

(65) Prior Publication Data

US 2012/0154993 A1 Jun. 21, 2012

(30) Foreign Application Priority Data

Dec. 17, 2010 (TW) .................................. 99144640

(51) Int. Cl.
*G06F 1/16* (2006.01)
*A47B 81/00* (2006.01)
*A47F 7/00* (2006.01)

(52) U.S. Cl. ........... 361/679.33; 361/679.37; 312/223.1; 312/223.2; 211/26

(58) Field of Classification Search .. 361/679.31–679.4, 361/724–727; 211/26; 312/223.1, 223.2
See application file for complete search history.

(56) References Cited

U.S. PATENT DOCUMENTS

| | | | | |
|---|---|---|---|---|
| 5,943,208 A * | 8/1999 | Kato et al. | ............... | 361/679.31 |
| 6,775,132 B2 * | 8/2004 | Chen et al. | ............... | 361/679.33 |
| 6,798,652 B2 * | 9/2004 | Wang et al. | ............... | 361/679.33 |
| 7,345,237 B2 * | 3/2008 | Chen et al. | ....................... | 174/50 |
| 7,813,117 B2 * | 10/2010 | Olesiewicz et al. | ...... | 361/679.34 |
| 2005/0088815 A1 * | 4/2005 | Chen et al. | ..................... | 361/685 |
| 2006/0007650 A1 * | 1/2006 | Shim | .............................. | 361/685 |
| 2008/0089021 A1 * | 4/2008 | Deng et al. | ..................... | 361/685 |

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

A mounting apparatus for a disk drive includes a first frame, a second frame opposite to the first frame, and two resilient members connected between the first and second frames. When the disk drive is mounted between the first and second frames, the resilient members are respectively positioned on opposite side surfaces of the disk drive.

7 Claims, 3 Drawing Sheets

MOUNTING APPARATUS FOR DISK DRIVE

BACKGROUND

1. Technical Field

The present disclosure relates to a mounting apparatus for a disk drive.

2. Description of Related Art

Disk drives are generally mounted in a bracket by screws and the bracket is then mounted in an enclosure of the computer. To mount the disk drives on the bracket, the bracket is deformed, and the disk drives are then received in the bracket. However, the bracket may be damaged due to excessive deformation, which is inconvenient.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
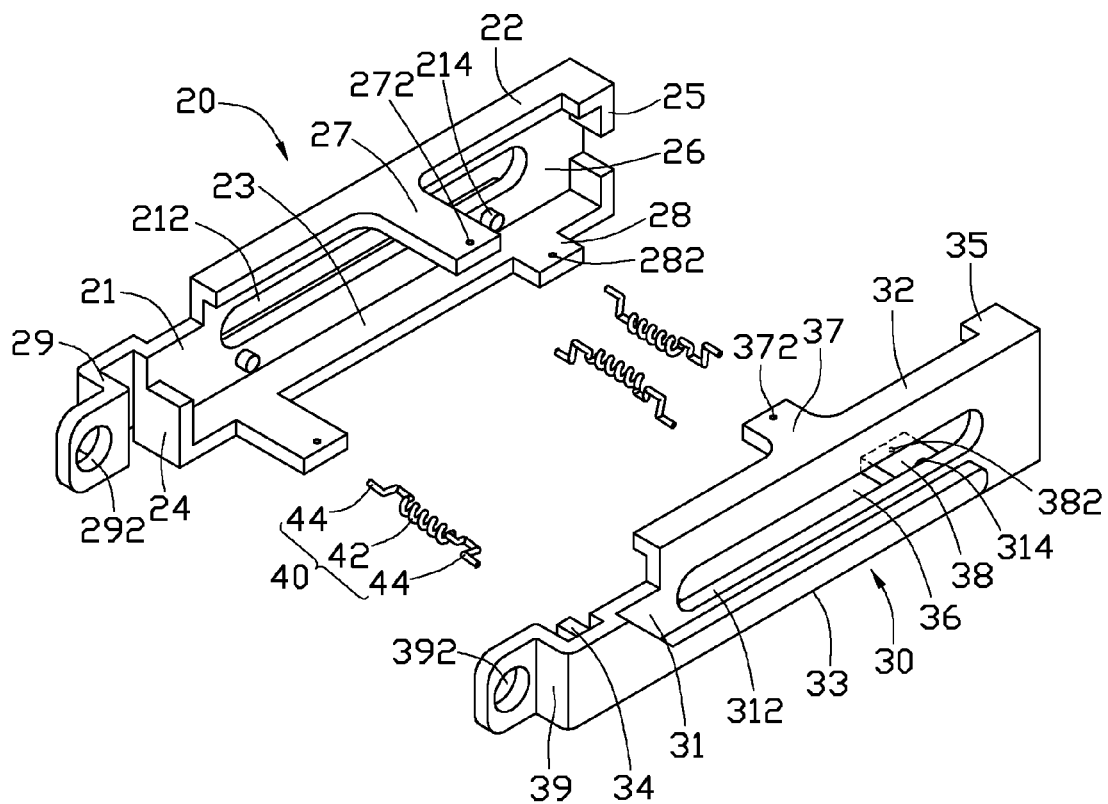
FIG. 1 is an exploded, isometric view of a mounting apparatus according to an exemplary embodiment.
Figure 2:
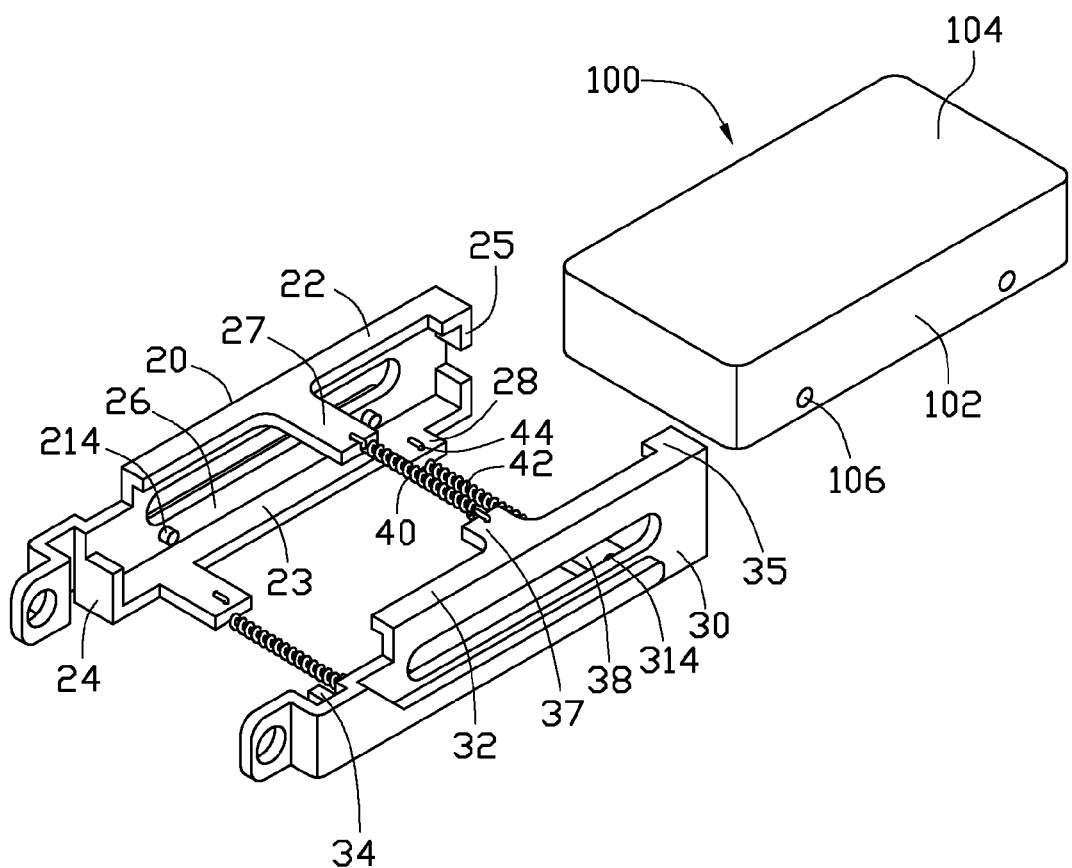
FIG. 2 is an assembled, isometric view of FIG. 1, together with a disk drive.

Referring to FIGS. 1 and 2, a mounting apparatus in accordance with an exemplary embodiment is provided to fix a disk drive 100 (shown in FIG. 2). The disk drive 100 includes opposite lateral surfaces 102, and opposite side surfaces 104 substantially perpendicularly connected between the lateral surfaces 102. Two mounting holes 106 are defined in each lateral surface 102.

The mounting apparatus includes a first frame 20, a second frame 30 symmetrical with the first frame 20, and a plurality of resilient members 40.

The first frame 20 includes a rectangular base panel 21, and opposite side panels 22 and 23 substantially perpendicularly extending from opposite sides of the base panel 21. Two limiting tabs 24 are substantially perpendicularly formed on opposite ends of the base panel 21 and connected to opposite ends of the side panel 23. The side panels 22 and 23 and the limiting tabs 24 together bound a holding chamber 26. A limiting tab 25, connected to an end of the side panel 22, is substantially perpendicularly formed on one end of the base panel 21 and aligns with a corresponding one of the limiting tabs 24. A longitudinal slot 212 is defined in the base panel 21 and extends along the lengthwise direction of the base panel 21. Two pins 214 protrude from the base panel 21 corresponding to the mounting holes 106 of one lateral surface 102 of the disk drive 100 and extend in the holding chamber 26. An extension tab 27 extends from the side panel 22, away from the base panel 21 and coplanar with the side panel 22. A locking hole 272 is defined in the extension tab 27, away from the side panel 22. Two spaced extension tabs 28 extend from the side panel 23, away from the base panel 21 and coplanar with the side panel 23. A locking hole 282 is defined in each extension tab 28. A clamp 29 defining a through hole 292 extends from the other end of the base panel 21, opposite to the limiting tab 25.

The second frame 30 includes a rectangular base panel 31, and opposite side panels 32 and 33 substantially perpendicularly extending from opposite sides of the base panel 31. Two limiting tabs 34 are substantially perpendicularly formed on opposite ends of the base panel 31 and connected to opposite ends of the side panel 33. The side panels 32 and 33 and the limiting tabs 34 together bound a holding chamber 36. A limiting tab 35, connected to an end of the side panel 32, is substantially perpendicularly formed on one end of the base panel 31 and aligns with a corresponding one of the limiting tabs 34. A longitudinal slot 312 is defined in the base panel 31 and extends along the lengthwise direction of the base panel 31. Two pins 314 protrude from the base panel 31 corresponding to the mounting holes 106 of the other lateral surface 102 of the disk drive 100 and extend in the holding chamber 36. An extension tab 37 extends from the side panel 32, away from the base panel 31 and coplanar with the side panel 32. A locking hole 372 is defined in the extension tab 37. Two spaced extension tabs 38 extend from the side panel 33, away from the base panel 31 and coplanar with the side panel 33. A locking hole 382 is defined in each extension tab 38. A clamp 39 defining a through hole 392 extends from the other end of the base panel 31, opposite to the limiting tab 35.

In the embodiment, the resilient members 40 are three extension springs 40. Each extension spring 40 includes a spiral segment 42 and two hooks 44 respectively extending from opposite ends of the spiral segment 42.

In assembly, the hooks 44 of the extension springs 40 are respectively locked in the locking holes 272 and 282 of the first frame 20 and the locking holes 372 and 382 of the second frame 30. Thus, the first and second frames 20 and 30 are connected by the extension springs 40.

Figure 3:
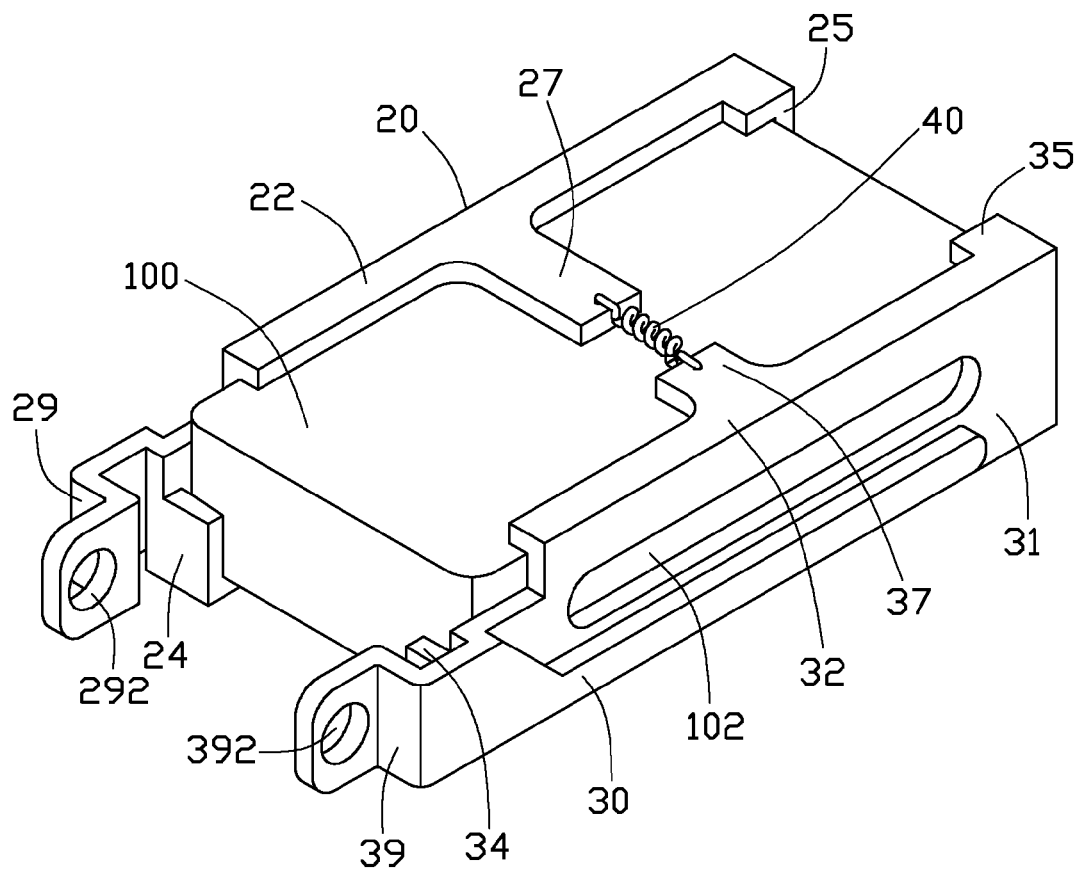
FIG. 3 is an assembled, isometric view of FIG. 2.

Referring to FIG. 3, in use, the first and second frames 20 and 30 are moved away from each other, and the extension springs 40 are resiliently stretched, therefore a distance between the first and second frames 20 and 30 increases. The disk drive 100 is put between the first and second frames 20 and 30 and the extension springs 40 are positioned on the corresponding side surfaces 104 of the disk drive 100. When the pins 214 and 314 of the first and second frames 20 and 30 respectively align with the mounting holes 106 of the disk drive 100. The first and second frames 20 and 30 are released. The extension springs 40 are restored to drive the first and second frames 20 and 30 to move toward each other. The pins 214 and 314 of the first and second frames 20 and 30 respectively engage in the mounting holes 106 of the disk drive 100. Thus, the disk drive 100 is received in the holding chambers 26 and 36 of the first and second frames 20 and 30, with the base panels 21 and 31 respectively resisting against the corresponding lateral surfaces 102 of the disk drive 100. The side panels 22, 23, 32, and 33 of the first and second frames 20 and 30 resist against the corresponding side surfaces 104 of the disk drive 100, and the limiting tabs 24, 25, 34, and 35 abut against opposite ends of the disk drive 100. The disk drive 100 is then conveniently sandwiched between the first and second frames 20 and 30 by the extension springs 40 without deformation of the first and second frames 20 and 30. The combined disk drive 100 and first and second frames 20 and 30 are mounted within an enclosure of an electronic device (not shown) by the clamps 29 and 39 engaging with the enclosure.

In other embodiments, only the limiting tabs 24 and 25 or the pins 214 are formed on the first frame 20, and only the limiting tabs 34 and 35 or the pins 314 are formed on the first frame 30. The locking holes 272 and 282 may be defined in the side panels 22 and 23 or any location of the first frame 20, such as the sides of the base panel 21, and the locking holes 372 and 382 may be defined in the side panels 32 and 33 or any location of the first frame 30, such as the sides of the base panel 31.

It is to be understood, however, that even though numerous characteristics and advantages have been set forth in the foregoing description of embodiments, together with details of the structures and functions of the embodiments, the present disclosure is illustrative only and changes may be made in detail, especially in matters of shape, size, and arrangement of parts within the principles of the present disclosure to the full extent indicated by the broad general meaning of the terms in which the appended claims are expressed.

What is claimed is:

1. A mounting apparatus for a disk drive, the mounting apparatus comprising: a first frame; a second frame opposite to the first frame, for sandwiching the disk drive in cooperation with the first frame; and at least two resilient members connected between the first and second frames, respectively positioned on opposite side surfaces of the disk drive, thereby biasing the first and second frames to firmly sandwich the disk drive; wherein two first locking holes are defined in the first frame, two second locking holes are defined in the second frame corresponding to the first locking holes of the first frame, each of the at least two resilient members comprises two hooks respectively locked in one of the first locking holes of the first frame and a corresponding one of the second locking holes of the second frame; wherein each of the first and second frames comprises a base panel and opposite first and second side panels substantially perpendicularly extending from opposite sides of the base panel, the base panel resisting against a corresponding lateral surface of the disk drive and the first and second side panels resisting against the side surfaces of the disk drive, in response to the disk drive mounted between the first and second frames; and wherein two first limiting tabs are respectively formed on opposite ends of the base panel of each of the first and second frames, the first and second side panels and the first limiting tabs of each of the first and second frames bound a holding chamber for holding a corresponding side of the disk drive.

2. The mounting apparatus of claim 1, wherein the first limiting tabs are respectively connected to opposite ends of the corresponding first side panel of each of the first and second frames.

3. The mounting apparatus of claim 2, wherein a second limiting tab, connected to an end of the second side panel of each of the first and second frames, is formed on one of the ends of the base panel of each of the first and second frames and aligns with the corresponding one of the first limiting tabs.

4. The mounting apparatus of claim 3, wherein a clamp defining a through hole extends from the other end of the base panel of each of the first and second frames.

5. The mounting apparatus of claim 1, wherein two pins protrude from the base panel of each of the first and second frames and extend in the corresponding holding chamber.

6. The mounting apparatus of claim 1, wherein two extension tabs respectively extend from the first and second side panels of each of the first and second frames, away from the corresponding base panel, the first locking holes of the first frame are respectively defined in the extension tabs of the first frame, the second locking holes of the second frames are respectively defined in the extension tabs of the second frame.

7. The mounting apparatus of claim 1, wherein the first and second frames are symmetrical with each other.

* * * * *